(12) United States Patent
Wyse

(10) Patent No.: US 10,917,132 B1
(45) Date of Patent: Feb. 9, 2021

(54) SWITCHLESS TRANSCEIVER INTEGRATED PROGRAMMABLE DIFFERENTIAL TOPOLOGY

(71) Applicant: Rockwell Collins, Inc., Cedar Rapids, IA (US)

(72) Inventor: Russell D. Wyse, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/507,726

(22) Filed: Jul. 10, 2019

(51) Int. Cl.
*H04B 1/44* (2006.01)
*H04B 1/16* (2006.01)
*H01Q 23/00* (2006.01)
*H04B 1/04* (2006.01)

(52) U.S. Cl.
CPC .............. *H04B 1/44* (2013.01); *H01Q 23/00* (2013.01); *H04B 1/0475* (2013.01); *H04B 1/16* (2013.01); *H04B 2001/0408* (2013.01)

(58) Field of Classification Search
CPC .. H04B 1/44–588; H04B 1/0458; H04B 1/18; H01Q 23/00
See application file for complete search history.

(56) References Cited

U.S. PATENT DOCUMENTS

| | | | | |
|---|---|---|---|---|
| 5,166,857 A | * | 11/1992 | Avanic ..................... | H01G 7/06 257/E29.344 |
| 6,426,680 B1 | * | 7/2002 | Duncan ............... | H01F 17/0006 257/E27.046 |
| 6,549,761 B1 | * | 4/2003 | Kim ..................... | H04B 1/0475 455/127.1 |
| 6,665,296 B1 | * | 12/2003 | Sturza ................. | H04L 12/2896 370/389 |
| 6,882,836 B2 | * | 4/2005 | Wilcox .................... | H04B 1/44 455/114.2 |
| 7,468,638 B1 | * | 12/2008 | Tsai ......................... | H04B 1/48 331/126 |
| 7,482,852 B1 | * | 1/2009 | Samavati ............. | H03D 7/1441 327/355 |
| 7,899,409 B2 | * | 3/2011 | Huang ................. | H04B 1/0458 455/78 |
| 7,920,833 B2 | * | 4/2011 | Qiao ....................... | H04B 1/44 455/78 |
| 8,442,451 B1 | * | 5/2013 | Tan ........................ | H04B 1/525 323/222 |
| 10,516,426 B1 | * | 12/2019 | Wyse ................... | H04B 1/1036 |

(Continued)

*Primary Examiner* — Gennadiy Tsvey
(74) *Attorney, Agent, or Firm* — Suiter Swantz pc llo

(57) ABSTRACT

A switchless transceiver module is disclosed. In one or more embodiments, the transceiver module includes at least a first port, a second port, and a third port. The first port is configured to be coupled to an antenna. The transceiver module further includes a low-noise amplifier (LNA) configured to receive incoming signals from the antenna in a receiving mode of operation. The second port is coupled to an output of the LNA. The transceiver module further includes a power amplifier (PA) configured to transmit outgoing signals to the antenna in a transmitting mode of operation. The third port is coupled to an input of the PA. In embodiments, the input of the LNA and the output of the PA are configured to provide isolation in the receiving mode of operation or the transmitting mode of operation based on impedance matching.

19 Claims, 4 Drawing Sheets

(56) References Cited

U.S. PATENT DOCUMENTS

| | | | | |
|---|---|---|---|---|
| 2001/0007151 A1* | 7/2001 | Vorenkamp | ......... | H01L 27/0248 725/151 |
| 2002/0120937 A1* | 8/2002 | Chang | ................... | H03H 11/04 725/68 |
| 2004/0097214 A1* | 5/2004 | Gard | ........................ | H04B 1/30 455/323 |
| 2004/0253939 A1* | 12/2004 | Castaneda | ................ | H04B 1/40 455/341 |
| 2004/0259505 A1* | 12/2004 | Vasanth | ................... | H04B 1/48 455/78 |
| 2005/0220217 A1* | 10/2005 | Yamawaki | ................ | H03F 1/02 375/297 |
| 2006/0091958 A1* | 5/2006 | Bhatti | ..................... | H03F 3/211 330/295 |
| 2007/0064833 A1* | 3/2007 | Sahota | ................. | H04B 1/0082 375/295 |
| 2007/0149146 A1* | 6/2007 | Hwang | ............. | H01Q 21/0025 455/80 |
| 2007/0232241 A1* | 10/2007 | Carley | .................... | H04B 1/44 455/83 |
| 2007/0270111 A1* | 11/2007 | Pan | ..................... | H03F 3/45188 455/127.1 |
| 2008/0207144 A1* | 8/2008 | Rofougaran | ........ | H03F 3/45179 455/108 |
| 2008/0207256 A1* | 8/2008 | Chan | ........................ | H04B 1/18 455/550.1 |
| 2008/0279262 A1* | 11/2008 | Shanjani | .................. | H04B 1/48 375/219 |
| 2009/0036065 A1* | 2/2009 | Siu | ......................... | H03F 1/223 455/78 |
| 2009/0154377 A1* | 6/2009 | Tsuda | .................... | H04B 1/403 370/277 |
| 2010/0085109 A1* | 4/2010 | Okanobu | ............ | H03K 17/162 327/534 |
| 2010/0197244 A1* | 8/2010 | Gomez | ................ | H03F 1/0277 455/78 |
| 2010/0321129 A1* | 12/2010 | Onody | ..................... | H03F 1/56 333/124 |
| 2011/0169587 A1* | 7/2011 | Wang | ...................... | H04B 1/52 333/124 |
| 2011/0279184 A1* | 11/2011 | Chan | ..................... | H03F 1/347 330/295 |
| 2011/0281527 A1* | 11/2011 | Chiang | ................... | H04B 1/44 455/73 |
| 2011/0281531 A1* | 11/2011 | Chiang | ................ | H04B 1/0458 455/75 |
| 2012/0015612 A1* | 1/2012 | Lin | ......................... | H04B 1/48 455/83 |
| 2013/0078931 A1* | 3/2013 | Jerng | .................... | H04B 1/44 455/78 |
| 2013/0109331 A1* | 5/2013 | Lee | ......................... | H04B 1/48 455/78 |
| 2014/0043104 A1* | 2/2014 | Chen | ....................... | G06F 1/10 331/46 |
| 2014/0170995 A1* | 6/2014 | Lin | ......................... | H04B 1/18 455/83 |
| 2015/0215150 A1* | 7/2015 | Chen | .................... | H04L 27/364 375/297 |
| 2016/0277078 A1* | 9/2016 | Trotta | ................. | H04L 27/2003 |
| 2018/0083720 A1* | 3/2018 | Kollmann | ................ | H04B 1/04 |
| 2018/0294832 A1* | 10/2018 | Chi | ........................ | H04B 1/44 |
| 2019/0109055 A1* | 4/2019 | Preisler | ..................... | H01L 21/84 |
| 2019/0356362 A1* | 11/2019 | Chi | ..................... | H04B 1/0064 |

* cited by examiner

SWITCHLESS TRANSCEIVER INTEGRATED PROGRAMMABLE DIFFERENTIAL TOPOLOGY

BACKGROUND

Front end transceiver modules currently rely on switches and/or circulators to connect an antenna to a receiving channel or a transmitting channel of a transceiver. Without the need for the switch/circulator in the transceiver module, it may be possible implement transmit and receive functionality on an integrated circuit (IC) node without high performance FET-based switches. Some advantages to such an approach may include, but are not limited to, reduced part count and complexity, reduced switch/circulator bandwidth impacts, and reduced circuit size.

SUMMARY

A switchless transceiver module is disclosed. In one or more embodiments, the transceiver module includes at least a first port, a second port, and a third port. The first port is configured to be coupled to an antenna. The transceiver module further includes a low-noise amplifier (LNA) configured to receive incoming signals from the antenna in a receiving mode of operation. The second port is coupled to an output of the LNA. The transceiver module further includes a power amplifier (PA) configured to transmit outgoing signals to the antenna in a transmitting mode of operation. The third port is coupled to an input of the PA. The input of the LNA and the output of the PA are configured to provide isolation in the receiving mode of operation or the transmitting mode of operation based on impedance matching, thereby obviating the need for switches to route the incoming and outgoing signals.

In some embodiments of the transceiver module, the input impedance of the LNA when the LNA is in an off state and the output impedance of the PA when the PA is in an on state are configured to cause the outgoing signals transmitted by the PA to flow through the antenna.

In some embodiments of the transceiver module, the input impedance of the LNA when the LNA is in an on state and the output impedance of the PA when the PA is in an off state are configured to cause the incoming signals from the antenna to flow through the LNA.

In some embodiments of the transceiver module, the LNA and the PA are coupled to a controller, and the controller is configured to control on/off states of the LNA and the PA by adjusting respective bias currents applied to the LNA and the PA.

In some embodiments of the transceiver module, the first port is coupled to the input of the LNA and the output of the PA by a switchless connection.

In some embodiments of the transceiver module, the second port is configured to be coupled to a transmitting channel of a transceiver, and the third port is configured to be coupled to a receiving channel of the transceiver.

In some embodiments of the transceiver module, the LNA and the PA are at least partially made of silicon germanium (SiGe) or silicon germanium bipolar plus complementary metal-oxide-semiconductor (SiGe BiCMOS) components.

In some embodiments of the transceiver module, the LNA and the PA are at least partially made of indium phosphide (InP) components.

A transceiver that includes the switchless transceiver module is also disclosed. In one or more embodiments, the transceiver includes an antenna, a transmitting channel, a receiving channel, and a transceiver module coupling the antenna to the transmitting channel and the receiving channel. The transceiver module includes at least a first port, a second port, and a third port. The first port is coupled to the antenna. The transceiver module further includes a low-noise amplifier (LNA) configured to receive incoming signals from the antenna in a receiving mode of operation. The second port is coupled to the receiving channel and to an output of the LNA. The transceiver module further includes a power amplifier (PA) configured to transmit outgoing signals to the antenna in a transmitting mode of operation. The third port is coupled to the transmitting channel and to an input of the PA. The input of the LNA and the output of the PA are configured to provide isolation in the receiving mode of operation or the transmitting mode of operation based on impedance matching, thereby obviating the need for switches to route the incoming and outgoing signals.

In some embodiments of the transceiver, the input impedance of the LNA when the LNA is in an off state and the output impedance of the PA when the PA is in an on state are configured to cause the outgoing signals transmitted by the PA to flow through the antenna by reflecting power off the LNA input "Off" impedance and out the antenna.

In some embodiments of the transceiver, the input impedance of the LNA when the LNA is in an on state and the output impedance of the PA when the PA is in an off state are configured to cause the incoming signals from the antenna to flow through the LNA by reflecting power off the PA output "Off" impedance and into the LNA.

In some embodiments of the transceiver, the transceiver further includes a controller that is coupled to the LNA and the PA and is configured to control on/off states of the LNA and the PA by adjusting respective bias currents applied to the LNA and the PA.

In some embodiments of the transceiver, the first port is coupled to the input of the LNA and the output of the PA by a switchless connection.

In some embodiments of the transceiver, the transceiver module is at least partially made of silicon germanium (SiGe) or silicon germanium bipolar plus complementary metal-oxide-semiconductor (SiGe BiCMOS) components.

In some embodiments of the transceiver, the transceiver module is at least partially made of indium phosphide (InP) components.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1A:
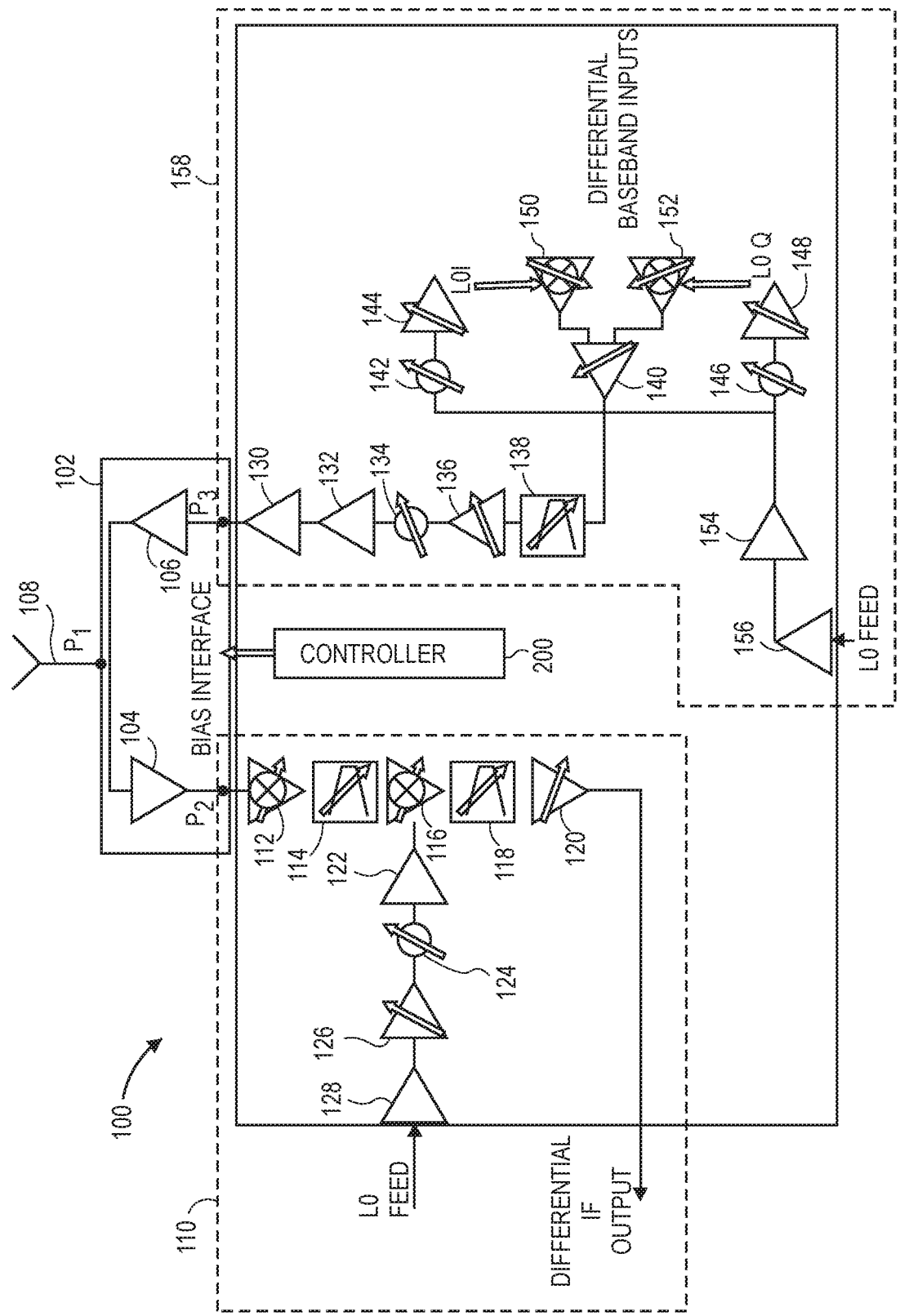
FIG. 1A is a block diagram illustrating a transceiver that includes a switchless transceiver module, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Various embodiments of a switchless transceiver module 102 are disclosed with reference to FIGS. 1A through 4. The transceiver module 102 provides a wideband differential transmitter/receiver (T/R) interface that eliminates the need for a radio frequency (RF) front end switch. Without the need for the switch/circulator in the transceiver module 102, it may be possible implement transmit and receive functionality on an integrated circuit (IC) node without high performance field-effect transistor (FET)-based switches. Some advantages to such an approach may include, but are not limited to, reduced part count and complexity and reduced switch/circulator bandwidth impacts.

Various embodiments of the transceiver module 102 have been tested. For example, silicon germanium bipolar plus complementary metal-oxide-semiconductor (SiGe BiCMOS) and indium phosphide (InP) design kits have been shown to demonstrate feasibility of wideband, low noise, high power, differential capability to take full advantage of differential antennae. Furthermore, operation of the transceiver module 102 at 1 GHz to over 20 GHz has been demonstrated with industry exceeding capability.

FIG. 1A illustrates an embodiment of a transceiver 100 that includes the switchless transceiver module 102. In embodiments, the transceiver 100 includes or is coupled with an antenna 108 (e.g., a differential antenna). The transceiver 100 further includes a receiving channel 110, a transmitting channel 158, and the transceiver module 102, which is configured to couple the antenna 102 to the receiving channel 110 and the transmitting channel 158.

The receiving channel 110 may include, but is not limited to, mixer/gain stages 112, 116, tunable bandpass filters 114, 118, variable gain amplifiers (VGAs) 120, 126, one or more phase shifters 124, and one or more active balun circuits 128. For example, RF signals received via the antenna 108 may be transmitted through a low noise amplifier (LNA) 104 of the transceiver module 102, mixer/gain stage 112, tunable bandpass filter 114, mixer/gain stage 116, tunable bandpass filter 118, and VGA 120 to produce differential intermediate frequency (IF) output signals. In some embodiments, a local oscillator LO (e.g., a synthesizer, crystal, or the like) feeds a LO frequency through active balun circuit 128, VGA 126, phase shifter 124, and LO buffer 122 to mixer/gain stage 116, and mixes the LO frequency with the incoming RF frequency to produce IF frequency signals that are then filtered (e.g., at tunable bandpass filter 118) and amplified (e.g., at VGA 120) to produce the differential IF output signals.

The transmitting channel 158 may include, but is not limited to, mixer/gain stages 150, 152, VGAs 136, 140, 144, 148, phase shifters 134, 142, 146, one or more tunable bandpass filters 138, and buffers 130, 132, 154, 156. For example, differential baseband input signals may be transmitted through in-phase mixer/gain stage 150 and quadrature mixer/gain stage 152 to produce differential intermediate frequency (IF) output signals that are conditioned by transmission through VGA 140, tunable bandpass filter 138, VGA 136, phase shifter 134, and buffers 130, 132 before being transmitted through a power amplifier (PA) 106 of the transceiver module 102 to the antenna 108. In some embodiments, a LO feeds a LO frequency through buffers 154, 156, in-phase and quadrature phase shifters 142, 146, and in-phase and quadrature VGAs 144, 148, and mixes the LO frequency with the differential baseband input signals at the in-phase mixer/gain stage 150 and quadrature mixer/gain stage 152 to produce the differential intermediate frequency (IF) output signals that are then conditioned and transmitted via antenna 108.

Figure 1B:
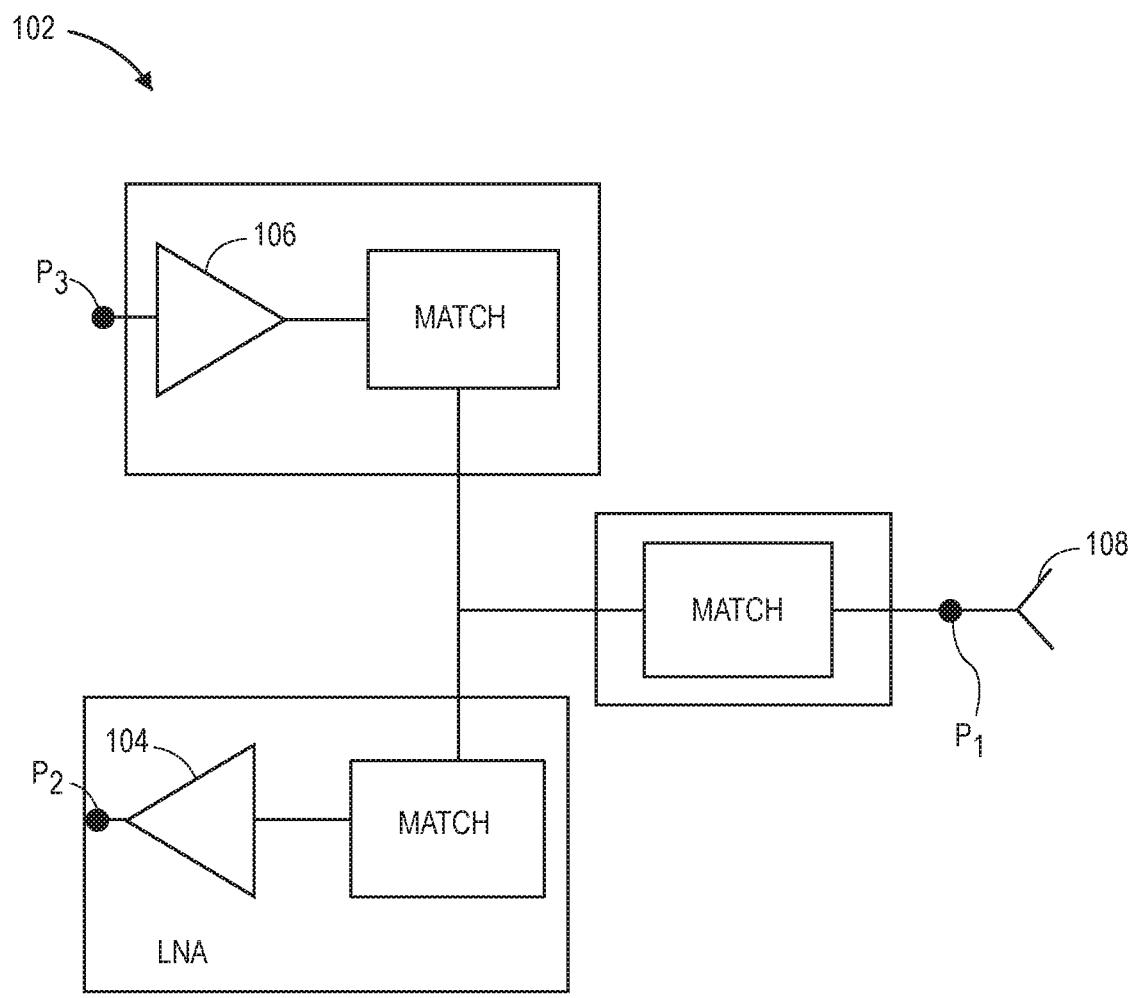
FIG. 1B is a block diagram illustrating a switchless transceiver module, in accordance with one or more embodiments of this disclosure.

Referring now to FIGS. 1A and 1B, the transceiver module 102 includes at least a first port (P1), a second port (P2), and a third port (P3). As used herein, the term "port" may refer to any physical connection interface (e.g., a pin, socket, lead, wire/cable connector, trace or other printed board (PB) connection, soldered connection, or the like).

The first port (P1) is configured to couple the transceiver module 102 with the antenna 108. For example, the first port (P1) may be coupled with or formed by an input of the LNA 104 and/or an output of the PA 106. In embodiments, the first port (P1) is coupled to the input of the LNA 104 and the output of the PA 106 by a switchless connection (e.g., connected to a common node without any switches in between the input of the LNA 104 and the output of the PA 106, the input of the LNA 104 and the first port (P1)/antenna 108, or the output of the PA 106 and the first port (P1)/antenna 108).

The transceiver module 102 includes LNA 104, which is configured to receive incoming signals from the antenna 108 in a receiving mode of operation. The second port (P2) is configured to couple the LNA 104 with the receiving channel 110 of the transceiver 100. For example, the second port (P2) may be coupled with or formed by an output of the LNA 104 and configured to connect to an input of the receiving channel 110.

The transceiver module 102 further includes PA 106, which is configured to transmit outgoing signals to the antenna 108 in a transmitting mode of operation. The third port (P3) is configured to couple the PA 106 with the transmitting channel 158 of the transceiver 100. For example, the third port (P3) may be coupled with or formed by an input of the PA 106 and configured to connect to an output of the transmitting channel 158.

In embodiments, the input of the LNA 104 and the output of the PA 106 are configured to provide reflectivity in the receiving mode of operation or the transmitting mode of operation based on impedance matching, thereby obviating the need for switches to route the incoming and outgoing signals to the desired paths. For example, the input impedance of the LNA 104 when the LNA 104 is in an "off"/ inactive state and the output impedance of the PA 106 when the PA 106 is in an "on"/active state are configured to cause the outgoing signals transmitted by the PA 106 to flow through the antenna 108, with little to no signal loss (e.g., <5% signal loss) through the LNA 104. Conversely, the input impedance of the LNA 104 when the LNA 104 is in an "on"/active state and the output impedance of the PA 106 when the PA 106 is in an "off"/inactive state are configured to cause the incoming signals from the antenna 108 to flow through the LNA 104, with little to no signal loss (e.g., <5% signal loss) through the PA 106. The "on" and "off" state impedances and/or impedance matches of LNA 104, PA 106, and antenna 108 work together to force signal routing without a switch, thereby potentially eliminating switch/ circulator losses, reducing part count/complexity, reducing switch/circulator bandwidth impacts and reducing circuit size.

The transceiver 100/transceiver module 102 may include a controller 200 that is configured to control on/off states of the LNA 104 and the PA 106 by adjusting respective bias currents applied to the LNA 104 and the PA 106. For example, the controller 200 may be coupled to the LNA 104 and the PA 106 via one or more bias interface connections. In some embodiments, the controller 200 is part of the main transceiver circuitry and coupled to the LNA 104 and the PA 106 via a bias interface of the transceiver module 102. In other embodiments, the controller 200 or at least a portion of the controller 200 may be included in the transceiver module 102. In other embodiments, the transceiver module 102 or at least a portion of the transceiver module 102 may be included in the main transceiver circuitry. Various configurations of the components, connectivity, and packaging may be employed without departing from the scope of this disclosure.

Figure 2:
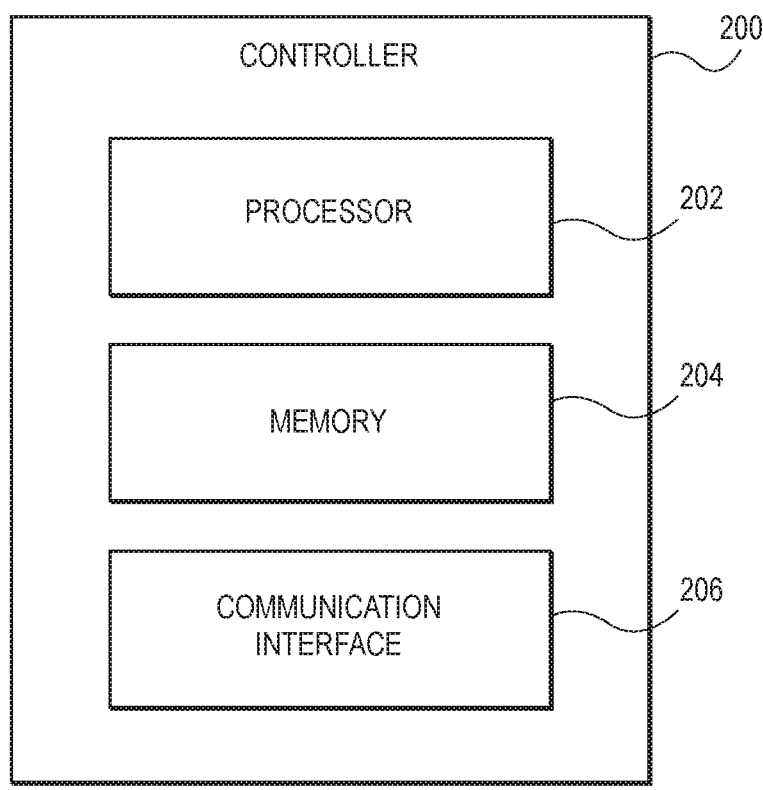
FIG. 2 is a block diagram illustrating a controller that can control bias currents to turn on/off a low-noise amplifier (LNA) or a phase amplifier (PA) of a switchless transceiver module, such as the switchless transceiver module illustrated in FIGS. 1A and 1B, in accordance with one or more embodiments of this disclosure.

FIG. 2 illustrates an embodiment of the controller 200, which may include, but is not limited to, at least one processor 202, memory 204, and communication interface 206. The processor 202 provides processing functionality for at least the controller 200 and can include any number of processors, micro-controllers, circuitry, field programmable gate array (FPGA) or other processing systems, and resident or external memory for storing data, executable code, and other information accessed or generated by the controller 200. The processor 202 can execute one or more software programs embodied in a non-transitory computer readable medium (e.g., memory 204) that implement techniques described herein. The processor 202 is not limited by the materials from which it is formed, or the processing mechanisms employed therein and, as such, can be implemented via semiconductor(s) and/or transistors (e.g., using electronic integrated circuit (IC) components), and so forth.

The memory 204 can be an example of tangible, computer-readable storage medium that provides storage functionality to store various data and/or program code associated with operation of the controller 200/processor 202, such as software programs and/or code segments, or other data to instruct the processor 202, and possibly other components of the controller 200, to perform the functionality described herein. Thus, the memory 204 can store data, such as a program of instructions for operating the controller 200, including its components (e.g., processor 202, communication interface 206, etc.), and so forth. It should be noted that while a single memory 204 is described, a wide variety of types and combinations of memory (e.g., tangible, non-transitory memory) can be employed. The memory 204 can be integral with the processor 202, can comprise stand-alone memory, or can be a combination of both. Some examples of the memory 204 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 206 can be operatively configured to communicate with components of the controller 200. For example, the communication interface 206 can be configured to retrieve data from the processor 202 or other devices, transmit data for storage in the memory 204, retrieve data from storage in the memory 204, and so forth. The communication interface 206 can also be communicatively coupled with the processor 202 to facilitate data transfer between components of the controller 200 and the processor 202. It should be noted that while the communication interface 206 is described as a component of the controller 200, one or more components of the communication interface 206 can be implemented as external components communicatively coupled to the controller 200 via a wired and/or wireless connection. The controller 200 may be connected to one or more input/output (I/O) devices, system components (e.g., PA 104, LNA 106, etc.), and so forth via the communication interface 206. In embodiments, the communication interface 206 may include a transmitter, receiver, transceiver, physical connection interface, or any combination thereof.

In some embodiments, the transceiver module 102 is at least partially made of silicon germanium (SiGe) or silicon germanium bipolar plus complementary metal-oxidesemiconductor (SiGe BiCMOS) components. In a SiGe BiCMOS implementation, the transceiver module 102 may achieve at least 1 to 18 GHz (1.8 decades of bandwidth). For SiGe BiCMOS technologies, the complementary metal-oxide-semiconductor (CMOS) FETS are typically not of high enough performance to produce wideband, high frequency, low loss switches. However, the CMOS FETs do work well for DC bias switching. In some embodiments, a DC bias switch on the differential LNA choke bias feeds can be used to modify the DC collector/emitter voltage behavior when the LNA is "off" and the PA is "on", to distribute the RF voltage swing across the LNA transistors such that they have enhanced breakdown voltage behavior and can sustain the PA output swing behavior without breaking down.

Figure 3:
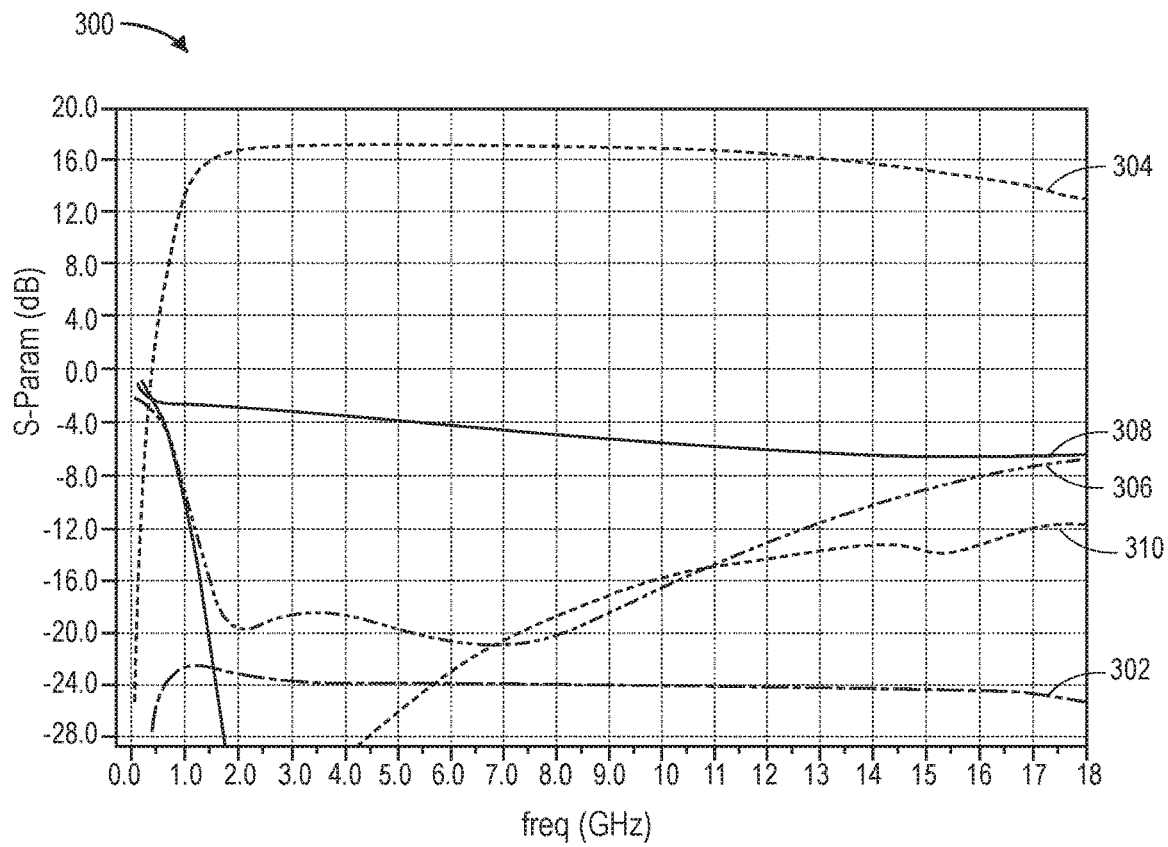
FIG. 3 is a graphical plot showing examples of signal response curves for a switchless transceiver module, such as the switchless transceiver module illustrated in FIGS. 1A and 1B, when the LNA is in an on/active state and the PA is in an off/inactive state, in accordance with one or more embodiments of this disclosure.

FIG. 3 is a graphical plot 300 showing examples of signal response curves for SiGe BiCMOS implementation of the switchless transceiver module 102, where the LNA 104 is in an on/active state and the PA 106 is in an off/inactive state (e.g., in a receiving mode of operation). In FIG. 3, curve 302 is the PA gain response, curve 304 is the LNA gain response, curve 306 is the input impedance match at the first port (P1)/antenna 108, curve 308 is the impedance match at the input of the PA 106, and curve 310 is the impedance match at the output of the LNA 104. As can be seen in FIG. 3, when the LNA 104 is in an on/active state and the PA 106 is in an off/inactive state, the LNA gain (curve 304) is high and the LNA impedance (curve 310) is matched (or nearly matched) to the input impedance (curve 306) at the first port (P1)/antenna 108; meanwhile, the PA gain (curve 302) is low and the PA impedance (curve 308) is higher than the LNA impedance (curve 310) and the input impedance (curve 306) at the first port (P1)/antenna 108. This configuration of impedance and gain values results in the transmission of incoming signals from the antenna 108 through the LNA 104 with little to no signal leakage through the PA 106.

Figure 4:
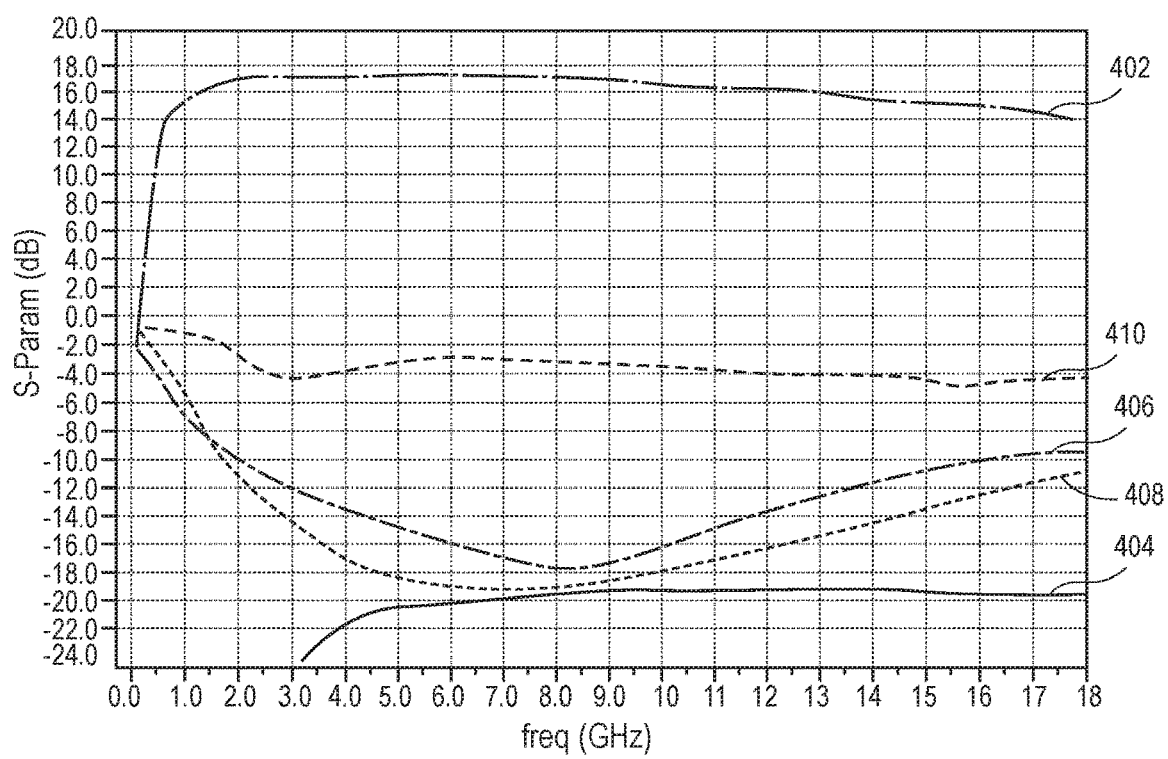
FIG. 4 is a graphical plot showing examples of signal response curves for a switchless transceiver module, such as the switchless transceiver module illustrated in FIGS. 1A and 1B, when the LNA is in an off/inactive state and the PA is in an on/active state, in accordance with one or more embodiments of this disclosure.

FIG. 4 is a graphical plot 400 showing examples of signal response curves for SiGe BiCMOS implementation of the switchless transceiver module 102, where the LNA 104 is in an off/inactive state and the PA 106 is in an on/active state (e.g., in a transmitting mode of operation). In FIG. 4, curve 402 is the PA gain response, curve 404 is the LNA gain response, curve 406 is the input impedance match at the first port (P1)/antenna 108, curve 408 is the impedance match at the input of the PA 106, and curve 410 is the impedance match at the output of the LNA 104. As can be seen in FIG. 4, when the LNA 104 is in an off/inactive state and the PA 106 is in an on/active state, the PA gain (curve 402) is high and the PA impedance (curve 408) is matched (or nearly matched) to the input impedance (curve 406) at the first port (P1)/antenna 108; meanwhile, the LNA gain (curve 404) is low and the LNA impedance (curve 410) is higher than the PA impedance (curve 408) and the input impedance (curve 406) at the first port (P1)/antenna 108. This configuration of impedance and gain values results in the transmission of outgoing signals through the PA 106, to the antenna 108, with little to no signal leakage through the LNA 104.

In some embodiments, the transceiver module 102 is at least partially made of indium phosphide (InP) components. Implementations of the transceiver module 102 based on InP architecture may provide for higher power and/or higher bandwidth. For example, InP implementations of the transceiver module 102 have been demonstrated to provide higher broadband output power capability from the PA 106. Furthermore, InP heterojunction bipolar transistors (HBTs) have greater breakdown voltage capability than SiGe HBTs. Operation of the transceiver module 102 at 2 GHz to over 20 GHz has been demonstrated with industry exceeding capability.

Other materials may be suitable for the switchless transceiver module 102, and as such, the examples provided herein should not be construed as limitations of the present disclosure unless otherwise specified in the claims.

Various embodiments of a switchless transceiver module and transceiver that includes the switchless transceiver module have been described with reference to FIGS. 1 through 4. However, in other embodiments, the transceiver module and/or the transceiver may be modified without deviating from the scope of this disclosure. For example, any of the components (e.g., ports, amplifiers, filters, mixers, controllers, etc.) described herein may be implemented by a plurality of components. In this regard, any reference to "a" or "the" component should be understood as a reference to "one or more" of the same component.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A transceiver module, comprising:
   a first port configured to be coupled to an antenna;
   a low-noise amplifier (LNA) configured to receive incoming signals at an input of the LNA from the antenna in a receiving mode of operation;
   a second port coupled to an output of the LNA, wherein the second port is coupled to a receiving channel, and the receiving channel includes a first gain stage, a second gain stage, a first tunable bandpass filter, a second tunable bandpass filter, a first variable gain amplifier, a second variable gain amplifier, a first phase shifter, and one or more active balun circuits;
   a power amplifier (PA) configured to transmit outgoing signals from an output of the PA to the antenna in a transmitting mode of operation; and
   a third port coupled to an input of the PA, wherein the third port is coupled to a transmitting channel, and the transmitting channel includes a third gain stage, a fourth gain stage, a third variable gain amplifier, a fourth variable gain amplifier, a fifth variable gain amplifier, a sixth variable gain amplifier, a second phase shifter, a third phase shifter, a fourth phase shifter, a third tunable bandpass filter, a first buffer, a second buffer, a third buffer, and a fourth buffer,
   wherein:

in the receiving mode of operation, (1) the LNA is in an on state and the PA is in an off state, (2) an input impedance of the LNA is lower than an output impedance of the PA, and (3) the input impedance of the LNA is nearly matched to an impedance of the antenna, in the transmitting mode of operation, (i) the PA is in an on state and the LNA is in an off state, (ii) the output impedance of the PA is lower than an input impedance of the LNA, and (iii) the output impedance of the PA is nearly matched to the impedance of the antenna, the LNA and the PA are coupled to a controller, wherein the controller is configured to control the on state and the off state of the LNA and the on state and the off state of the PA by adjusting respective bias currents applied to the LNA and the PA, and the receiving channel includes a local oscillator (LO), and the LO is configured to feed an LO frequency through the one or more active balun circuits, the first variable gain amplifier, the first phase shifter, an LO buffer, and the second gain stage.

2. The transceiver module of claim 1, wherein the first port is coupled to the input of the LNA and the output of the PA by a switchless connection.

3. The transceiver module of claim 1, wherein the LNA and the PA comprise silicon germanium (SiGe) or silicon germanium bipolar plus complementary metal-oxide-semiconductor (SiGe BiCMOS) components.

4. The transceiver module of claim 1, wherein the LNA and the PA comprise indium phosphide (InP) components.

5. The transceiver module of claim 1, wherein the second gain stage is configured to mix the LO frequency with an incoming RF frequency to produce intermediate frequency (IF) signals.

6. The transceiver module of claim 5, wherein the second tunable bandpass filter is configured to filter the IF signals and the second variable gain amplifier is configured to amplify the IF signals to produce differential IF output signals.

7. The transceiver module of claim 1, wherein the transmitting channel includes a local oscillator (LO).

8. The transceiver module of claim 7, wherein the transmitting channel LO is configured to feed an LO frequency through the first buffer, the second buffer, the third phase shifter, the fourth phase shifter, the third variable gain amplifier, the fourth variable gain amplifier, the third gain stage, and the fourth gain stage.

9. The transceiver module of claim 8, wherein the third gain stage and the fourth gain stage are configured to mix the LO frequency with differential baseband input signals to produce differential intermediate frequency (IF) output signals.

10. The transceiver module of claim 9, wherein the differential IF output signals are configured to be transmitted through the fifth variable gain amplifier, the third tunable bandpass filter, the sixth variable gain amplifier, the second phase shifter, the third buffer and the fourth buffer.

11. The transceiver module of claim 1, wherein the third phase shifter comprises an in-phase phase shifter and the fourth phase shifter comprises a quadrature phase shifter.

12. The transceiver module of claim 1, wherein the third variable gain amplifier comprises an in-phase variable gain amplifier and the fourth variable gain amplifier comprises a quadrature variable gain amplifier.

13. A transceiver, comprising:
an antenna;
a receiving channel including a first gain stage, a second gain stage, a first tunable bandpass filter, a second tunable bandpass filter, a first variable gain amplifier, a second variable gain amplifier, a first phase shifter, and one or more active balun circuits;
a transmitting channel including a third gain stage, a fourth gain stage, a third variable gain amplifier, a fourth variable gain amplifier, a fifth variable gain amplifier, a sixth variable gain amplifier, a second phase shifter, a third phase shifter, a fourth phase shifter, a third tunable bandpass filter, a first buffer, a second buffer, a third buffer, and a fourth buffer; and
a transceiver module coupling the antenna to the transmitting channel and the receiving channel, the transceiver module including:
a first port coupled to the antenna;
a low-noise amplifier (LNA) configured to receive incoming signals at an input of the LNA from the antenna in a receiving mode of operation;
a second port coupled to the receiving channel and to an output of the LNA;
a power amplifier (PA) configured to transmit outgoing signals from an output of the PA to the antenna in a transmitting mode of operation; and
a third port coupled to the transmitting channel and to an input of the PA,
wherein:
in the receiving mode of operation, (1) the LNA is in an on state and the PA is in an off state, (2) an input impedance of the LNA is lower than an output impedance of the PA, and (3) the input impedance of the LNA is nearly matched to an impedance of the antenna,
in the transmitting mode of operation, (i) the PA is in an on state and the LNA is in an off state, (ii) the output impedance of the PA is lower than an input impedance of the LNA, and (iii) the output impedance of the PA is nearly matched to the impedance of the antenna,
the LNA and the PA are coupled to a controller, wherein the controller is configured to control the on state and the off state of the LNA and the on state and the off state of the PA by adjusting respective bias currents applied to the LNA and the PA, and
the receiving channel includes a local oscillator (LO), and the LO is configured to feed an LO frequency through the one or more active balun circuits, the first variable gain amplifier, the first phase shifter, an LO buffer, and the second gain stage.

14. The transceiver of claim 13, wherein the first port is coupled to the input of the LNA and the output of the PA by a switchless connection.

15. The transceiver of claim 13, wherein the transceiver module comprises silicon germanium (SiGe) or silicon germanium bipolar plus complementary metal-oxide-semiconductor (SiGe BiCMOS) components.

16. The transceiver of claim 13, wherein the transceiver module comprises indium phosphide (InP) components.

17. The transceiver module of claim 13, wherein the third phase shifter comprises an in-phase phase shifter and the fourth phase shifter comprises a quadrature phase shifter.

18. The transceiver module of claim 13, wherein the third variable gain amplifier comprises an in-phase variable gain amplifier and the fourth variable gain amplifier comprises a quadrature variable gain amplifier.

19. A transceiver module, comprising:
a first port configured to be coupled to an antenna;
a low-noise amplifier (LNA) configured to receive incoming signals at an input of the LNA from the antenna in a receiving mode of operation;
a second port coupled to an output of the LNA, wherein the second port is coupled to a receiving channel, and the receiving channel includes a first gain stage, a second gain stage, a first tunable bandpass filter, a second tunable bandpass filter, a first variable gain amplifier, a second variable gain amplifier, a first phase shifter, and one or more active balun circuits;
a power amplifier (PA) configured to transmit outgoing signals from an output of the PA to the antenna in a transmitting mode of operation; and
a third port coupled to an input of the $PA_X$ wherein the third port is coupled to a transmitting channel, and the transmitting channel includes a third gain stage, a fourth gain stage, a third variable gain amplifier, a fourth variable gain amplifier, a fifth variable gain amplifier, a sixth variable gain amplifier, a second phase shifter, a third phase shifter, a fourth phase shifter, a third tunable bandpass filter, a first buffer, a second buffer, a third buffer, and a fourth buffer,
wherein:
in the receiving mode of operation, (1) the LNA is in an on state and the PA is in an off state, (2) an input impedance of the LNA is lower than an output impedance of the PA, and (3) the input impedance of the LNA is nearly matched to an impedance of the antenna,
in the transmitting mode of operation, (i) the PA is in an on state and the LNA is in an off state, (ii) the output impedance of the PA is lower than an input impedance of the LNA, and (iii) the output impedance of the PA is nearly matched to the impedance of the antenna,
the LNA and the PA are coupled to a controller, wherein the controller is configured to control the on state and the off state of the LNA and the on state and the off state of the PA by adjusting respective bias currents applied to the LNA and the PA,
the transmitting channel includes a local oscillator (LO) configured to feed an LO frequency through the first buffer, the second buffer, the third phase shifter, the fourth phase shifter, the third variable gain amplifier, the fourth variable gain amplifier, the third gain stage, and the fourth gain stage,
the third gain stage and the fourth gain stage are configured to mix the LO frequency with differential baseband input signals to produce differential intermediate frequency (IF) output signals, and
the differential IF output signals are configured to be transmitted through the fifth variable gain amplifier, the third tunable bandpass filter, the sixth variable gain amplifier, the second phase shifter, the third buffer and the fourth buffer.

* * * * *